(12) United States Patent
Awai

(10) Patent No.: US 10,278,031 B2
(45) Date of Patent: Apr. 30, 2019

(54) INFORMATION PROCESSING METHOD AND INFORMATION PROCESSING APPARATUS

(71) Applicant: SONY CORPORATION, Tokyo (JP)

(72) Inventor: Shoichi Awai, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 15/533,706

(22) PCT Filed: Dec. 7, 2015

(86) PCT No.: PCT/JP2015/006052
§ 371 (c)(1),
(2) Date: Jun. 7, 2017

(87) PCT Pub. No.: WO2016/120931
PCT Pub. Date: Aug. 4, 2016

(65) Prior Publication Data
US 2017/0332209 A1    Nov. 16, 2017

(30) Foreign Application Priority Data
Jan. 28, 2015  (JP) ................................. 2015-014182

(51) Int. Cl.
*H04W 4/06* (2009.01)
*G06F 13/00* (2006.01)
(Continued)

(52) U.S. Cl.
CPC .............. *H04W 4/06* (2013.01); *G06F 13/00* (2013.01); *H04L 47/14* (2013.01); *H04N 21/436* (2013.01);
(Continued)

(58) Field of Classification Search
CPC ........ H04W 4/06; H04W 24/04; H04L 47/14; H04L 47/12; H04N 21/436
See application file for complete search history.

(56) References Cited

U.S. PATENT DOCUMENTS

| | | | | |
|---|---|---|---|---|
| 2002/0063777 | A1* | 5/2002 | Maekawa | H04N 7/181 348/143 |
| 2012/0250547 | A1* | 10/2012 | Fujita | H04W 4/06 370/252 |

FOREIGN PATENT DOCUMENTS

| | | |
|---|---|---|
| JP | 2002-247566 A | 8/2002 |
| JP | 2006-186601 A | 7/2006 |
| JP | 2012-213110 A | 11/2012 |

OTHER PUBLICATIONS

International Search Report and Written Opinion of PCT Application No. PCT/JP2015/006052, dated Mar. 1, 2016, 01 pages of English Translation and 06 pages of ISRWO.

* cited by examiner

*Primary Examiner* — Lakeram Jangbahadur
(74) *Attorney, Agent, or Firm* — Chip Law Group

(57) ABSTRACT

An information processing apparatus according to an embodiment of the present technology includes a determination unit and a delivery control unit. The determination unit determines, regarding each of a plurality of reproduction apparatuses, which becomes a target of streaming delivery of content by unicast via a wireless network, whether or not a communication state of the wireless network is normal. The delivery control unit excludes a communication failure apparatus that is a reproduction apparatus of the plurality of reproduction apparatuses, whose communication state is determined not to be normal, from the target of the streaming delivery by the unicast.

21 Claims, 11 Drawing Sheets

(51) Int. Cl.
*H04N 21/436* (2011.01)
*H04W 24/04* (2009.01)
*H04L 12/801* (2013.01)
*H04N 21/4363* (2011.01)
*H04N 21/442* (2011.01)
*H04N 21/6375* (2011.01)
*H04N 21/6405* (2011.01)
*H04N 21/6408* (2011.01)

(52) U.S. Cl.
CPC . *H04N 21/43615* (2013.01); *H04N 21/43637* (2013.01); *H04N 21/44227* (2013.01); *H04N 21/6375* (2013.01); *H04N 21/6405* (2013.01); *H04N 21/6408* (2013.01); *H04W 24/04* (2013.01); *H04L 47/12* (2013.01)

INFORMATION PROCESSING METHOD AND INFORMATION PROCESSING APPARATUS

CROSS REFERENCE TO RELATED APPLICATIONS

This application is a U.S. National Phase of International Patent Application No. PCT/JP2015/006052 filed on Dec. 7, 2015, which claims priority benefit of Japanese Patent Application No. JP 2015-014182 filed in the Japan Patent Office on Jan. 28, 2015. Each of the above-referenced applications is hereby incorporated herein by reference in its entirety.

TECHNICAL FIELD

The present technology relates to an information processing method, an information processing apparatus, and a program that are applicable to streaming delivery of content via a wireless network.

BACKGROUND ART

Conventionally, a technology of streaming content such as music and video via a wireless network is known. For example, Patent Literature 1 has disclosed a technology for shortening a delay time of data delivery and increasing data throughput in the case where a server in a communication network having a wireless space receives data delivery requests from a plurality of terminals.

In a wireless communication system described in Patent Literature 1, in the case where data delivery requests are transmitted from the plurality of terminals, link speed of each terminal and each access point is detected and compared. On the basis of the result of comparison, a bit rate of streaming data delivered to the terminal is controlled. With this, congestion due to new data delivery is prevented.

CITATION LIST

Patent Literature

Patent Literature 1: Japanese Patent Application Laid-open No. 2006-186601

DISCLOSURE OF INVENTION

Technical Problem

In a system of delivering content to a plurality of terminals via such a wireless network, it is desirable to provide a technology by which stable streaming delivery that suppresses lowering of communication quality to be performed is made possible.

In view of the above-mentioned circumstances, it is an object of the present technology to provide an information processing method, an information processing apparatus, and a program by which stable streaming delivery that suppresses lowering of communication quality is made possible.

Solution to Problem

In order to accomplish the above-mentioned object, an information processing apparatus according to an embodiment of the present technology includes a determination unit and a delivery control unit.

The determination unit determines, regarding each of a plurality of reproduction apparatuses, which becomes a target of streaming delivery of content by unicast via a wireless network, whether or not a communication state of the wireless network is normal.

The delivery control unit excludes a communication failure apparatus that is a reproduction apparatus of the plurality of reproduction apparatuses, whose communication state is determined not to be normal, from the target of the streaming delivery by the unicast.

In this information processing apparatus, when content is streamed by the unicast, the communication state of the wireless network regarding each reproduction apparatus is determined. Then, the communication failure apparatus whose communication state is determined not to be normal is excluded from the target of unicast transmission. With this, stable streaming delivery that suppresses lowering of communication quality becomes possible.

The plurality of reproduction apparatuses may constitute a group capable of concurrently reproducing identical content. In this case, the delivery control unit may exclude the communication failure apparatus from the target of the streaming delivery of the identical content by the unicast.

With this, the concurrent reproduction of the identical content is maintained by other reproduction apparatuses excluding the communication failure apparatus whose communication state is determined not to be normal. Therefore, it is possible to prevent interruption of content reproduction, for example.

The determination unit may regularly execute determination of the communication state. In this case, if it is, in the regular determination of the determination unit, determined that the communication state of the communication failure apparatus has normally recovered, the delivery control unit may set the reproduction apparatus, which had been the communication failure apparatus, as the target of the streaming delivery by the unicast.

With this, reproduction by the reproduction apparatus whose communication state has recovered is automatically restarted, and hence it becomes possible to construct a useful content delivery system.

The determination unit may determine the communication state on the basis of at least one of the number of retransmission requests per unit time that are transmitted from each of the plurality of reproduction apparatuses and communication quality information transmitted from each of the plurality of reproduction apparatuses.

With this, it is possible to highly accurately determine the communication state of each reproduction apparatus.

The communication quality information may include information on at least one of reception electric field strength and data transfer speed.

With this, it is possible to highly accurately determine the communication state of each reproduction apparatus.

Each of the plurality of reproduction apparatuses may be connected to an access point via the wireless network. In this case, the information processing apparatus may further include an acquisition unit that acquires device information of the access point, which relates to streaming delivery of the content by multicast. Further, the delivery control unit may select, on the basis of the acquired device information, either of the streaming delivery by the unicast and the streaming delivery by the multicast for execution.

In this information processing apparatus, either of unicast transmission and multicast transmission is selected on the basis of the device information of the multipoint, which relates to multicast delivery. With this, efficient content delivery is realized.

The device information may include information on a band available for the streaming delivery by the multicast. In this case, the delivery control unit may select the streaming delivery by the multicast if a bit rate of the content is equal to or smaller than the band available for the streaming delivery by the multicast.

With this, the available band can be saved.

The information processing apparatus may further include a setting unit capable of variably setting a bit rate of the content. In this case, the delivery control unit may select the streaming delivery by the multicast if the bit rate set by the setting unit is equal to or smaller than the available band.

With this, content can be efficiently delivered.

The information processing apparatus may further include a connection unit and a delivery unit.

The connection unit is connectable to the plurality of reproduction apparatuses via the wireless network.

The delivery unit is capable of delivering the content to each of the plurality of reproduction apparatuses via the wireless network by the unicast.

An information processing method according to an embodiment of the present technology is an information processing method executed by a computer, the method including: determining, regarding each of a plurality of reproduction apparatuses, which becomes a target of streaming delivery of content by unicast via a wireless network, whether or not a communication state of the wireless network is normal.

A communication failure apparatus that is a reproduction apparatus of the plurality of reproduction apparatuses, whose communication state is determined not to be normal, is excluded from the target of the streaming delivery by the unicast.

A program according to an embodiment of the present technology causes a computer to execute the following steps.

The step of determining, regarding each of a plurality of reproduction apparatuses, which becomes a target of streaming delivery of content by unicast via a wireless network, whether or not a communication state of the wireless network is normal.

The step of excluding a communication failure apparatus that is a reproduction apparatus of the plurality of reproduction apparatuses, whose communication state is determined not to be normal, from the target of the streaming delivery by the unicast.

Advantageous Effects of Invention

As described above, in accordance with the present technology, it is possible to realize stable streaming delivery that suppresses lowering of communication quality. It should be noted that the effect described here is not necessarily limitative and may be any effect described in the present disclosure.

MODE(S) FOR CARRYING OUT THE INVENTION

Hereinafter, an embodiment according to the present technology will be described with reference to the drawings.

[Network System]

Figure 1:
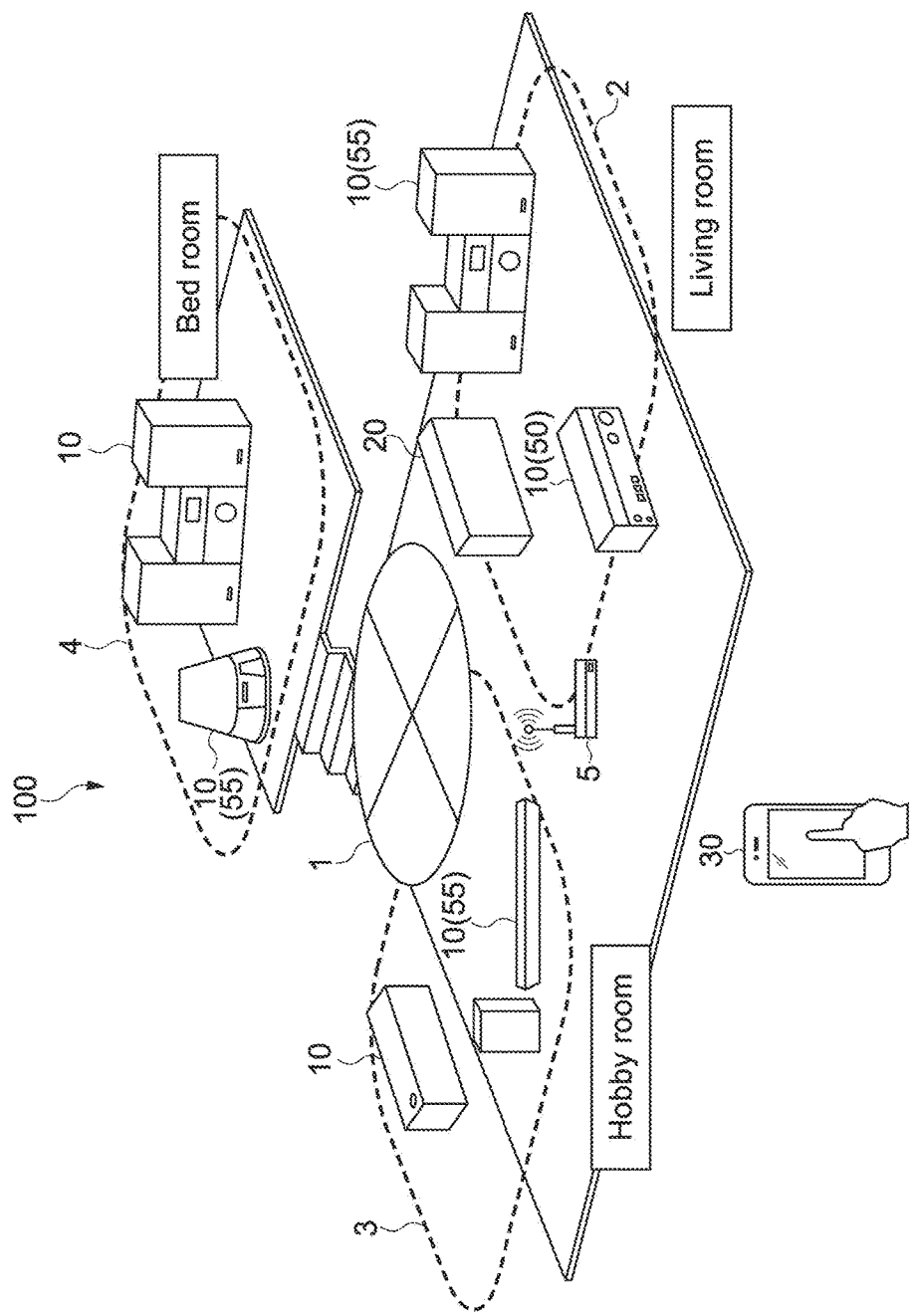
FIG. 1 A schematic diagram showing a configuration example of a network system according to an embodiment.

FIG. 1 is a schematic diagram showing a configuration example of a network system according to an embodiment of the present technology. A network system 100 includes a home network 1 constructed in a home, a plurality of reproduction apparatuses 10 connected thereto, a server apparatus 20 that provides content, and a portable terminal 30.

The plurality of reproduction apparatuses 10, the server apparatus 20, and the portable terminal 30 are connected to the home network 1 via a wireless communication such as WiFi via an access point 5. Thus, the home network 1 corresponds to a wireless network according to this embodiment. Note that the present technology is applicable in an arbitrary wireless network such as a wireless LAN and a wireless WAN.

A network according to DLNA (Digital Living Network Alliance) standard, for example, is used as the home network 1. In this case, the plurality of reproduction apparatuses 10 function as DMRs (Digital Media Renderers) and the server apparatus 20 functions as a DMS (Digital Media Server). Further, the portable terminal 30 functions as a DMC (Digital Media Controller). Note that a network using another protocol may be used.

As shown in FIG. 1, the plurality of reproduction apparatuses 10 are placed in respective rooms of a living room 2, a hobby room 3, and a bed room 4. The user can instruct the reproduction apparatus 10 placed in each room to reproduce content of the server apparatus 20 by operating the portable terminal 30. Note that the number of reproduction apparatus 10, server apparatus 20, and the like is not limited.

One operable as a DMP (Digital Media Player) may be placed as the reproduction apparatus 10. In this case, the content of the server apparatus 20 can be reproduced by operating a UI (User Interface) of that reproduction apparatus 10.

In this embodiment, music content is reproduced by the plurality of reproduction apparatuses 10. However, the present technology is not limited to reproduction of music content and is applicable to reproduction of various types of content such as video.

Examples of the reproduction apparatus 10 include a television apparatus, a PC (Personal computer), an audio video receiver, a video monitor, and a household game console. Examples of the server apparatus 20 include HDD (NAS) compatible with a PC or network. A smartphone is typically used as the portable terminal 30, though not limited thereto. Various PDAs (Personal Digital Assistants) such as a tablet terminal may be used.

[Multi-Room Reproduction]

Multi-room reproduction of content executed by the network system 100 will be described. The multi-room reproduction is a reproduction method of concurrently reproducing identical content by a group constituted of the two or more reproduction apparatuses 10 connected to the home network 1.

For example, by causing the plurality of reproduction apparatuses 10 placed in an identical room to reproduce identical content, it is possible to enjoy music with large sound volume within the entire room. Alternatively, for example, in the case of inviting many friends to a party, it is possible to animate the party by causing the reproduction apparatuses 10 placed in the respective rooms to reproduce identical content and controlling operations thereof at the same time.

In the case where the multi-room reproduction is executed, one of the two or more reproduction apparatuses 10 that constitute the group is set as a master apparatus 50 and the other reproduction apparatuses 10 are set as slave apparatuses 55. The master apparatus 50 downloads identical content from the server apparatus 20 and streams it to the slave apparatuses 55 at the same time. With this, the multi-room reproduction of the content is realized.

In the example shown in FIG. 1, the group is constituted of the two reproduction apparatuses 10 placed in the living room 2, the single reproduction apparatus 10 placed in the hobby room 3, and the single reproduction apparatus 10 placed in the bed room 4. Among them, one of the reproduction apparatuses 10 placed in the living room 2 is set as the master apparatus 50 and the other reproduction apparatuses 10 are set as the slave apparatuses 55.

The reproduction apparatus 10 capable of executing multi-room reproduction operates as an information processing apparatus according to the present technology. Further, an information processing method according to the present technology is executed by the reproduction apparatus 10 set as the master apparatus 55. Note that, in this embodiment, all the reproduction apparatuses 10 (also called multi-room compatible apparatuses) are capable of executing multi-room reproduction.

[Configuration of Reproduction Apparatus]

Figure 2:
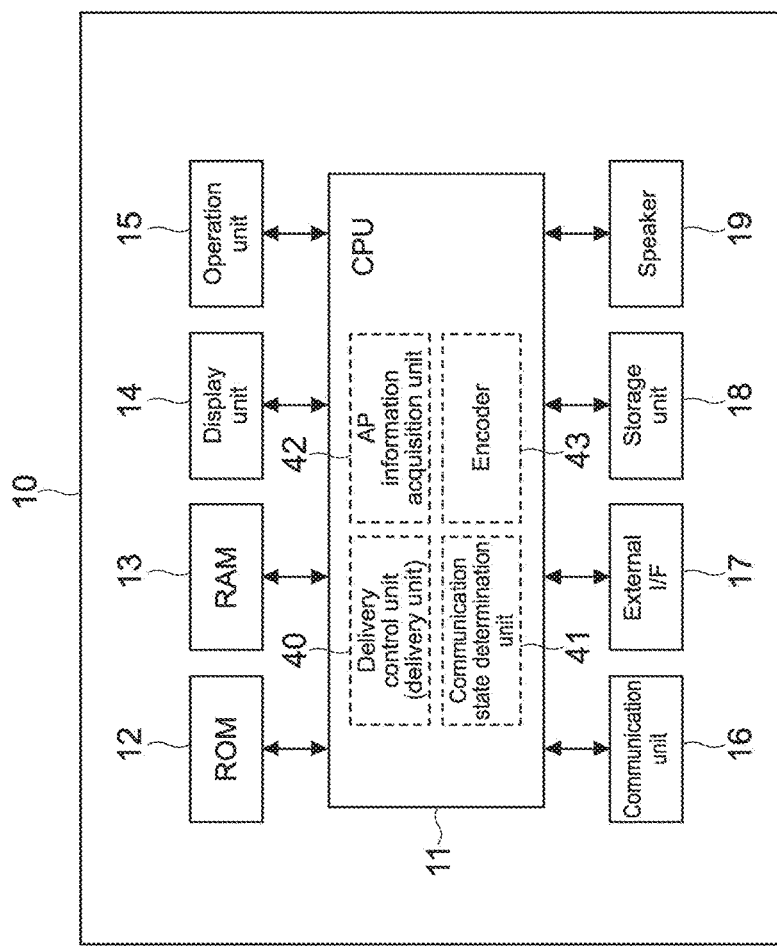
FIG. 2 A block diagram showing a configuration example of a reproduction apparatus shown in FIG. 1.

FIG. 2 is a block diagram showing a configuration example of the reproduction apparatus 10. The reproduction apparatus 10 includes a CPU (Central Processing Unit) 11, a ROM (Read Only Memory) 12, a RAM (Random Access Memory) 13, a display unit 14, and an operation unit 15. Further, the reproduction apparatus 10 includes a communication unit 16, an external I/F (interface) 17, a storage unit 18, and a speaker 19.

The CPU 11 exchanges signals with the respective blocks of the reproduction apparatus 10 and performs various arithmetic operations. The CPU 11 generally controls various types of processing executed by the reproduction apparatus 10. Examples of the various types of processing include reproduction of audio content from the speaker 19, display of images on the display unit 14, and streaming delivery of content to the slave apparatuses 55.

The ROM 12 stores various types of data and various programs such as an application that are processed by the CPU 11. The RAM 13 is used as a working area for the CPU 11. In the case where a program is executed by the CPU 11, data necessary for executing it is developed.

The display unit 14 is, for example, a display device using liquid crystal, EL (Electro-Luminescence), or the like. The operation unit 15 is, for example, a controller, a pointing device, a keyboard, a touch panel, or another operation apparatus. In the case where the operation unit 15 includes a touch panel, that touch panel can be integrated with the display unit 14.

The communication unit 16 is an interface for connecting the reproduction apparatus 10 to the home network 1. For example, a wireless LAN module such as WiFi is provided as the communication unit 16. Otherwise, a communication device such as a modem and a router may be used. The communication unit 16 functions as a connection unit in this embodiment.

The external I/F 17 is, for example, an interface for connecting to an external apparatus in accordance with standards such as USB or HDMI (registered trademark) (High-Definition Multimedia Interface). Otherwise, an interface for connecting to various memory cards may be configured.

The storage unit 18 is a nonvolatile storage device. The storage unit 18 is, for example, an HDD (Hard Disk Drive), a flash memory, or another solid-state memory. Content and the like downloaded from the server apparatus 20, for example, are stored in the storage unit 18. Further, the above-mentioned various types of data, programs, and the like may be stored.

Information processing by the reproduction apparatus 10 having the hardware configuration as described above is realized in cooperation of software stored in the ROM 12 and the storage unit 18 and hardware resources of the reproduction apparatus 10. The information processing method according to the present technology is realized by, for example, the CPU 11 loading a program according to the present technology, which is stored in the ROM 12 or the like, into the RAM 13 and executing the program.

At that time, as shown in FIG. 2, the CPU 11 functions as a delivery control unit 40, a communication state determination unit 41, an AP (access point) information acquisition unit 42, and an encoder 43. For realizing those blocks, dedicated hardware may be used if necessary.

The programs such as an application are installed into the reproduction apparatus 10 from a global network, for example. Alternatively, the program may be installed into the reproduction apparatus 10 via a recording medium.

[Operation of Master Apparatus]

Figure 3A:
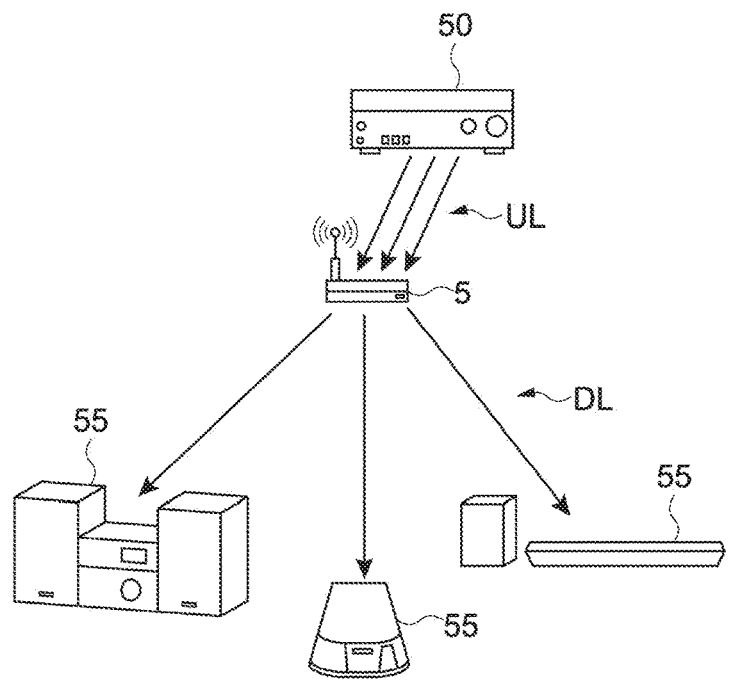
FIGS. 3A and 3B Schematic views for describing a system for streaming delivery of content.
Figure 3B:
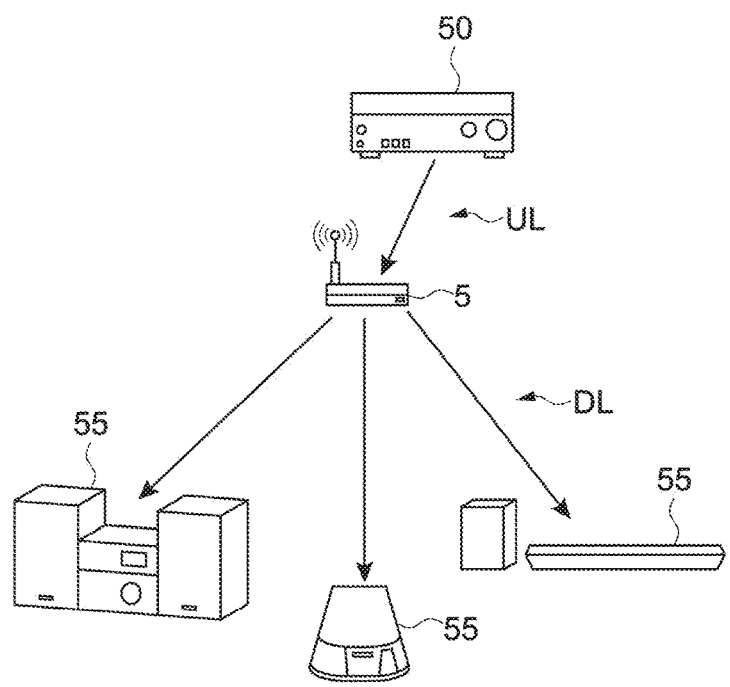

FIGS. 3A and 3B are schematic views for describing a system for streaming delivery of content. As shown in FIGS. 3A and 3B, content is streamed by the master apparatus 50 to the plurality of slave apparatuses 55 via the access point 5. Note that the master apparatus 50 can also be called transmitter and the slave apparatuses 55 can also be called receivers.

In this embodiment, the master apparatus 50 is capable of selecting either of the streaming delivery by the unicast and the streaming delivery by the multicast. Such streaming delivery is executed in accordance with, for example, a UDP (User Datagram Protocol). Hereinafter, the streaming delivery by the unicast will be referred to as unicast transmission and the streaming delivery by the multicast will be referred to as multicast transmission.

FIG. 3A is a schematic view showing an operation example of the unicast transmission. In the unicast transmission, the master apparatus 50 individually executes streaming delivery of content on each of the plurality of slave apparatuses 55.

Therefore, if the access point 5 is used as a reference, a data transfer band (bps) corresponding to two links is necessary for the single slave apparatus 55. One of the two links is an uplink UL from the master apparatus 50 to the access point 5 and the other is a downlink DL from the access point 5 to the slave apparatus 55. As a matter of course, if the number of slave apparatuses 55 is incremented by one, a data transfer band corresponding to new two links in addition to the two links is necessary.

In this embodiment, a wireless network is constructed and a wireless band is shared by the slave apparatuses 55 in the group. Therefore, data transfer speed of the single slave apparatus 55 is equal to or smaller than one divided by the total number of slave apparatuses 55.

FIG. 3B is a schematic view showing an operation example of the multicast transmission. In the multicast transmission, all the slave apparatuses 55 are grouped and a multicast group is constituted. The master apparatus 50 transmits single content data to an address of the multicast group as a destination. That content data is copied by the access point 5 and streamed to all the slave apparatuses 55 belonging to the multicast group. The operation of the access point 5 at this time is also called multicast transfer.

As shown in FIG. 3B, at the uplink UL, content delivery to all the slave apparatuses 55 can be performed by using a data transfer band corresponding to the single link. Thus, it is possible to greatly save the available band of the transmission link. However, in the function, the settings, and the like of the access point 5, the multicast transfer can be impossible (multicast incompatible) or the band available for the multicast transfer can be limited in some cases. In the case where an upper limit of the available band is low, high-quality content cannot be delivered.

In the case where the multicast transfer by the access point 5 is impossible, multicast transmission by the master apparatus 50 is impossible. Further, a band available for the multicast transfer by the access point 5 corresponds to a band available for the multicast transmission by the master apparatus 50.

In this embodiment, during initialization for executing the multi-room reproduction, the master apparatus 50 determines whether the access point 5 can receive multicast transmission, that is, whether the multicast transfer is possible. Further, if the multicast transfer is possible, an upper limit of the available band thereof is measured.

Therefore, device information on the multicast transmission of the access point 5 (by the master apparatus 50) is acquired by the AP information acquisition unit 42 shown in FIG. 2. That device information includes information on the band available for the multicast transmission (by the master apparatus 50). Note that it can also be said that device characteristics relating to the multicast transmission of the access point 5 are network characteristics with respect to multicast transmission of the home network 1.

Figure 4:
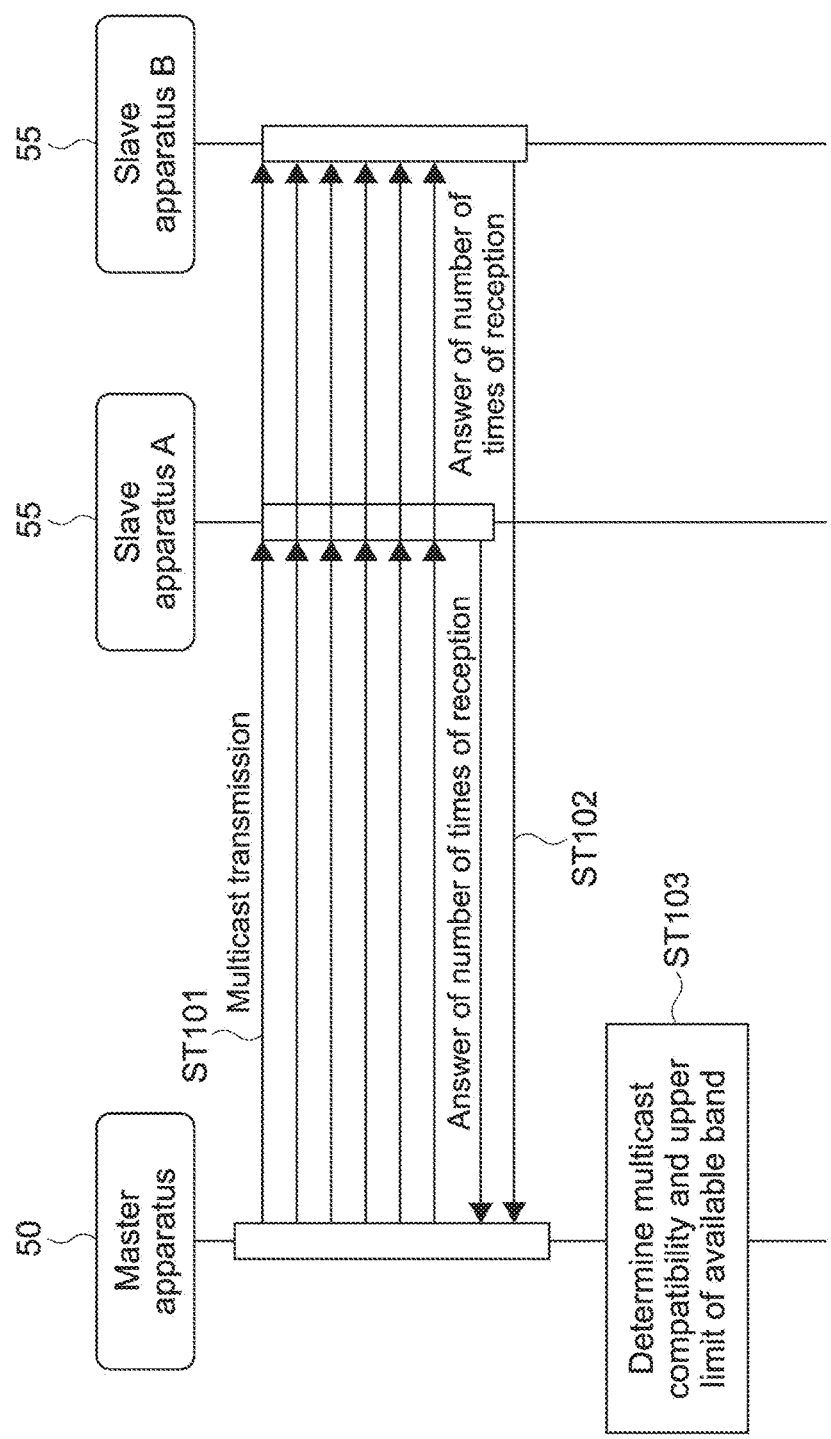
FIG. 4 A sequence diagram showing a processing example in which device information of an access point is acquired.

FIG. 4 is a schematic sequence diagram showing a processing example for acquiring device information of the access point 5. In FIG. 4, for the sake of simplification of the drawing, two slave apparatuses 55a and 55b are shown. Also in the case where more slave apparatuses 55 are present, it is only necessary to execute processing similar to processing described with reference to FIG. 4. The same applies to FIGS. 5 to 9.

First of all, the multicast transmission is executed by the delivery control unit 40 a predetermined number of times or more per unit time (Step 101). The predetermined number of times are not limited. Some, many times are set as the predetermined number of times. Note that the delivery control unit 40 also functions as a delivery unit capable of executing the unicast transmission and the multicast transmission via the home network 1 in this embodiment.

The master apparatus 50 receives a response of the number of times of reception from the respective slave apparatuses 55, which depends on mass-volume multicast transmission (Step 102). The AP information acquisition unit 42 calculates, on the basis of the number of times of reception, device information on the multicast transmission and determines whether or not the access point 5 is compatible with the multicast and an upper limit of the available band (Step 103).

For example, if the number of times of reception is zero, the access point 5 is determined not to be compatible with the multicast. If the number of times of reception is one or more, the number of times of possible multicast transmission per unit time, that is, an upper limit of the band available for the multicast transmission is calculated on the basis of a lowest value of the number of times of reception for each of the slave apparatuses 55.

Note that, in the following description, the upper limit of the band available for the multicast transmission will be simply referred to as an available band of the multicast transmission and, for example, the phrases "larger than the available band" and the phrases "equal to or smaller than the available band" will be shown in some cases.

On the basis of the device information acquired (calculated) by the AP information acquisition unit 42, either of the unicast transmission and the multicast transmission is selected by the delivery control unit 40. For example, in the case where the access point 5 is incompatible with the multicast, the unicast transmission is selected.

Figure 5:
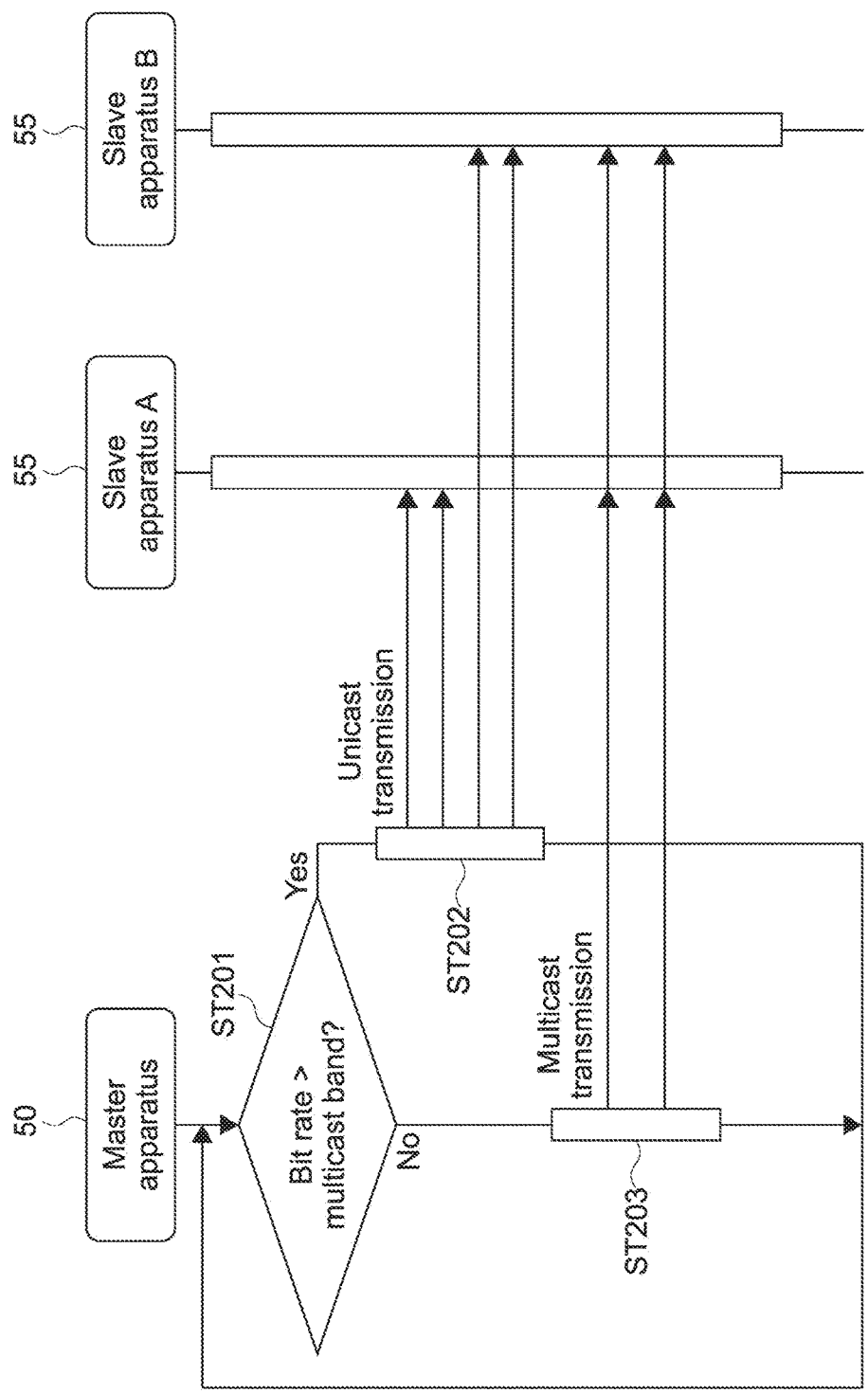
FIG. 5 Flowchart and sequence diagram showing an example of selection of a delivery system in the case where the access point is compatible with multicast.

FIG. 5 is flowchart and sequence diagram showing an example of selection of a delivery system in the case where the access point 5 is compatible with the multicast. First of all, whether or not the bit rate (bps) of content is larger than the available band of the multicast transmission is determined (Step 201). If it is determined that the bit rate is larger (Yes in Step 201), the unicast transmission is executed (Step 202).

If it is determined that the bit rate is equal to or smaller than the available band (No in Step 202), the unicast transmission is executed (Step 203). In this manner, the selection of the unicast transmission and the multicast transmission is appropriately performed on the basis of the device information of the access point 5 (network information of home network 1), and hence efficient content delivery is realized.

In this embodiment, the bit rate of the content in encoding can be variably set by the encoder 43 shown in FIG. 2. The determination processing of Step 201 is executed on the basis of a variable bit rate (VBR) set by the encoder 43.

For example, when content is downloaded from the server apparatus 20, encoding is executed by the encoder 43 at a predetermined bit rate. Although the value of the bit rate at this time is not limited, it is set by the user, for example. Further, the bit rate in encoding by the server apparatus 20 may be set as an initial bit rate.

Setting (changing) the bit rate by the encoder 43 may be executed at an arbitrary timing, for example, during content delivery. In this case, the determination processing of Step 201 is appropriately executed in a manner that depends on a change in the bit rate, for example. Changing the bit rate will be described later. The encoder 43 functions as a setting unit in this embodiment.

[Operation of Unicast Transmission]

Figure 6:
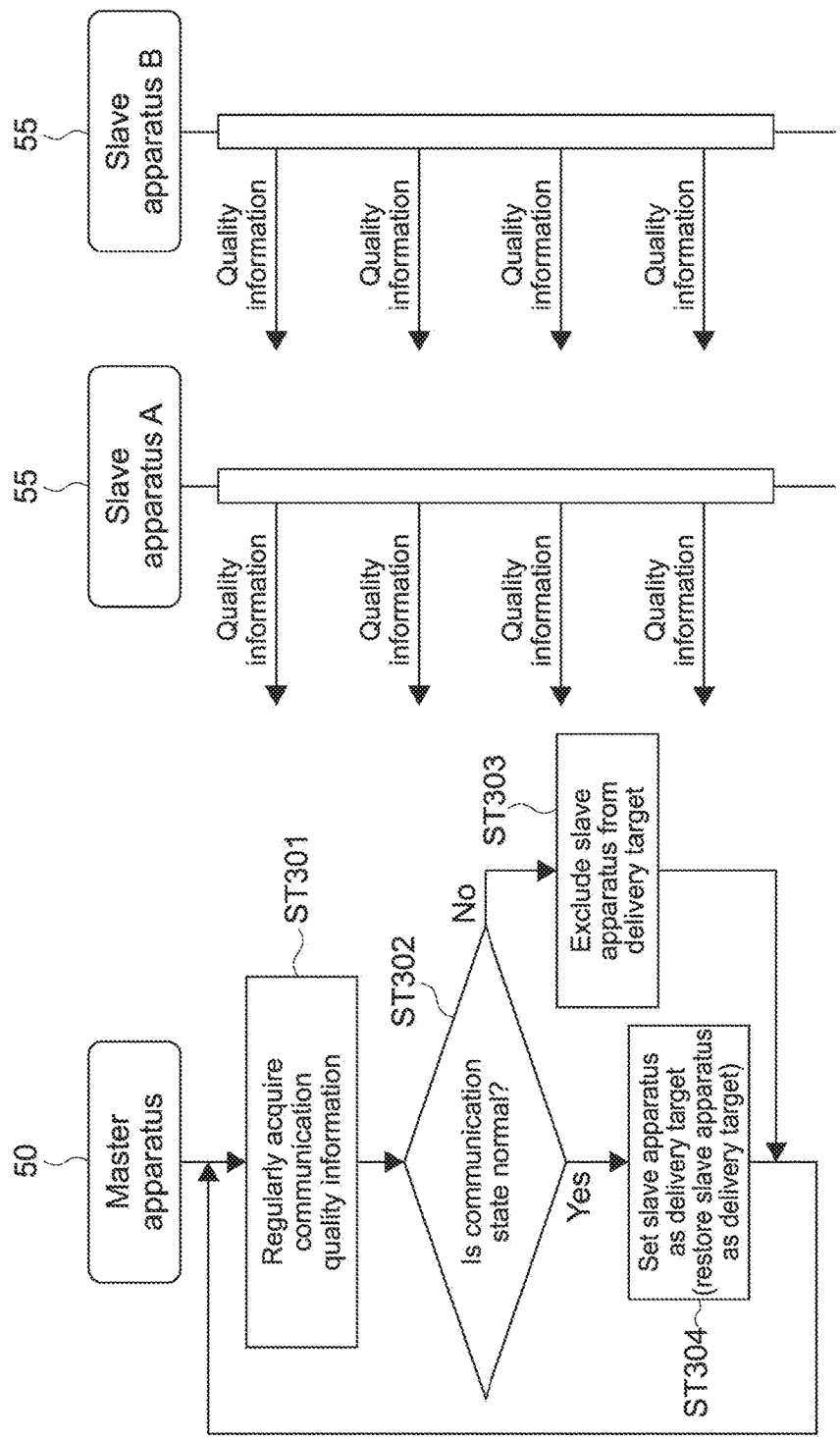
FIG. 6 Flowchart and sequence diagram showing a processing example of determination of a communication state in the case where unicast transmission is selected.

FIG. 6 is flowchart and sequence diagram showing a processing example of determination of a communication state in the case where the unicast transmission is selected. In this embodiment, with respect to each of the plurality of slave apparatuses 55 that becomes the target of the unicast transmission by the communication state determination unit 41 shown in FIG. 2 via the home network 1, whether or not the communication state of the home network 1 is normal is determined. The communication state of the home network 1 regarding each slave apparatus 55 is a communication state of the link from the master apparatus 50 to each slave apparatus 55.

First of all, as shown in FIG. 6, communication quality information transmitted from each of the plurality of slave apparatuses 55 is regularly acquired (Step 301). For example, each slave apparatus 55 transmits the communication quality information to the master apparatus 50 at predetermined time intervals, for example, 5 seconds. Alternatively, a request for regularly transmitting the communication quality information from the master apparatus 50 to each slave apparatus 55 may be transmitted.

The communication quality information is information with which the condition of the link from the master apparatus 50 to each slave apparatus 55 can be evaluated. Typically, the communication quality information includes information on at least one of reception electric field strength and the data transfer speed that are calculated by each slave apparatus 55. As a matter of course, the communication quality information is not limited thereto and another parameter for evaluating throughput (effective speed), information on link speed, and the like may be transmitted as the communication quality information.

The communication state determination unit 41 determines whether or not the communication state is normal for each slave apparatus 55, on the basis of the communication quality information acquired from each slave apparatus 55 (Step 302). The slave apparatus 55 whose communication state is determined not to be normal is excluded from the target of the unicast transmission by the delivery control unit 40 (No in Steps 302 to 303). Hereinafter, the slave apparatus 55 whose communication state is determined not to be normal will be referred to as a communication failure apparatus in some cases.

The slave apparatus 55 whose communication state is determined to be normal is set as the target of the unicast transmission by the delivery control unit 40 (Yes in Steps 302 to 304). Typically, all the slave apparatuses 55 are set as the targets of the unicast transmission when the unicast transmission is selected. Therefore, such a setting is maintained.

The determination processing of Step 302 is regularly executed every time the communication quality information is acquired. It is assumed that, in that regular determination, the communication state of the slave apparatus 55 determined to be the communication failure apparatus in the preceding determination is determined to be normal in new determination. In this case, it is determined that the communication state has recovered, and the slave apparatus 55, which had been the communication failure apparatus, is restored as the target of the unicast transmission (also Step 304).

For example, it is assumed that the communication quality is lowered due to an error in the transmission link and the data transfer speed (link speed) of at least one of the slave apparatuses 55 decreases. Although the cause of an error is not limited, it is highly likely that a microwave oven or the like is located in a near place and electromagnetic interference occurs due to operations of the microwave oven, which causes an error, for example.

If at least one of slave apparatuses 55 has low throughput, it influences the streaming delivery to the other slave apparatuses 55 and the throughput of the entire system is lowered. For example, retransmission request of missing packets from the slave apparatus 55 whose communication quality is lowered is repeated and the traffic of the entire system is congested. Otherwise, when an error occurrence rate of a wireless path increases, the link speed of the entire system is lowered by the access point 5 in some cases for establishing a stable communication path.

If the throughput of the entire system is lowered, reproduction of content may not be appropriately performed. For example, in the case where the content is multimedia data that requires real-time property, the data may not arrive in a requested time and sound interruption may occur and video may also stop.

In view of such problems, in this embodiment, in the case where content is unicast-transmitted, the communication state of each slave apparatus 55 is regularly monitored. Then, the communication failure apparatus whose communication state is determined not to be normal is excluded from the target of the unicast transmission and the unicast transmission is maintained by setting the slave apparatus 55 whose communication state is determined to be normal as the target.

As a result, the multi-room reproduction is maintained by the other slave apparatuses 55 excluding the communication failure apparatus and the stop of content reproduction can be sufficiently prevented, for example. Therefore, the user can enjoy viewing of the content continuously.

By using the present technology in this manner, it becomes possible to realize stable streaming delivery that suppresses lowering of communication quality of the entire network. For example, an error due to collision of packets and retransmission or the like for recovering it can be sufficiently suppressed.

Further, the determination of the communication state is regularly executed. Therefore, the slave apparatus 55, which had been determined to be the communication failure apparatus, can be restored as the target of the unicast transmission along with recovery of the communication state. That is, the communication failure apparatus whose communication state is lowered is merely temporarily excluded from a content delivery target. When the communication state has recovered, content reproduction of that reproduction apparatus is automatically restarted. As a result, it becomes possible to construct a useful content delivery system. In this embodiment, a multi-room reproduction system excellent as a product can be realized.

Figure 7:
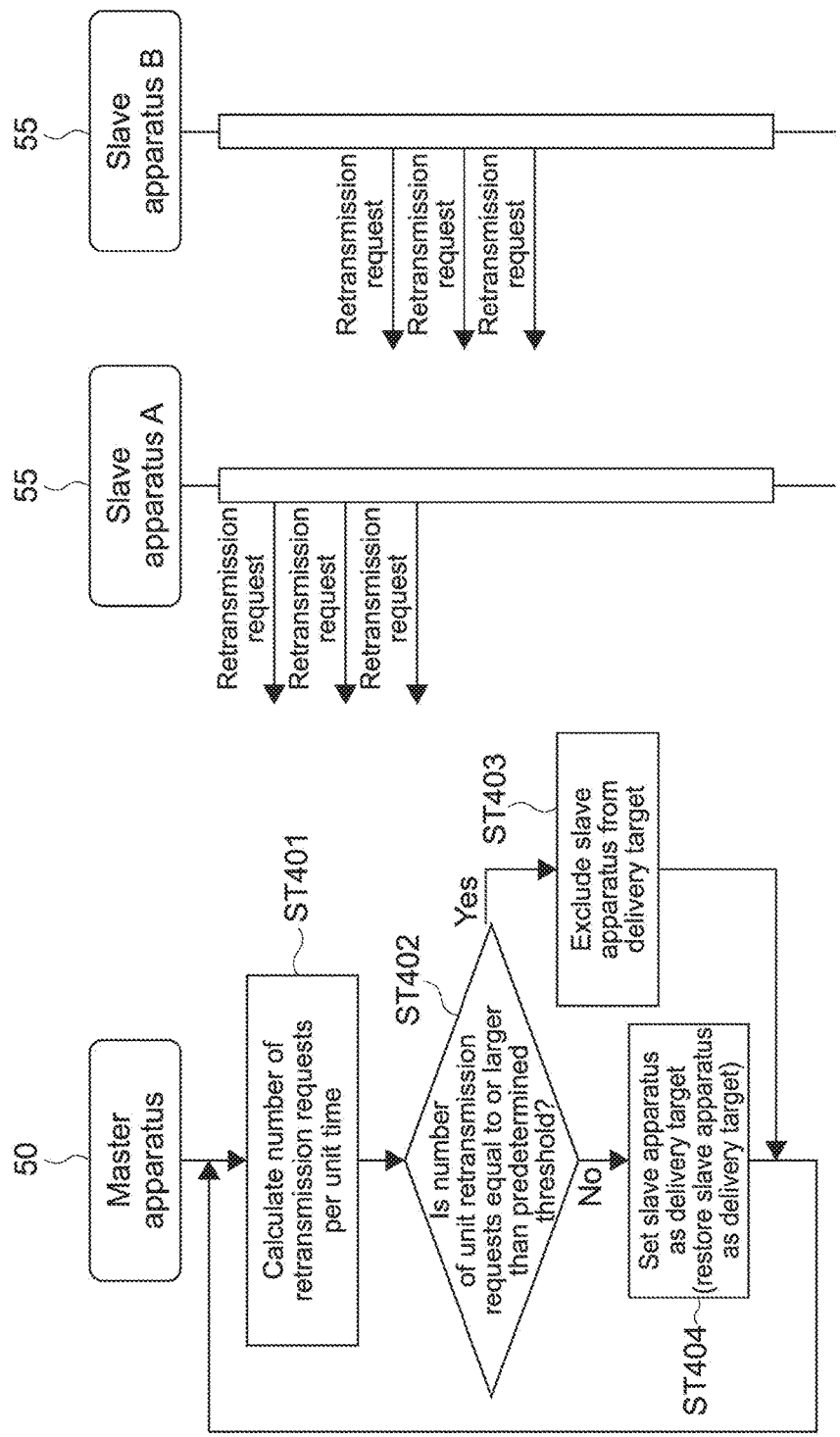
FIG. 7 Flowchart and sequence diagram showing another processing example of the determination of the communication state.

FIG. 7 is flowchart and sequence diagram showing another processing example for determining the communication state. The number of retransmission requests per unit time that are transmitted from each of the plurality of slave apparatuses 55 is calculated by the communication state determination unit (Step 401). The number of retransmission requests typically corresponds to the number of missing packets.

The slave apparatus 55 whose number of retransmission requests per unit time (hereinafter, referred to as number of unit retransmission requests) is equal to or larger than a predetermined threshold is determined to be the communication failure apparatus whose communication state is not normal and is excluded from the target of the unicast transmission (Yes in Steps 402 to 403). The slave apparatus 55 whose number of unit retransmission requests is smaller than the predetermined threshold is determined to be the slave apparatus 55 whose communication state is normal and is set as the target of the unicast transmission or restored as the target (Step 402 No to Step 404).

In this manner, on the basis of the number of unit retransmission requests transmitted from each slave apparatus 55, whether or not the communication state is normal may be determined. Further, the communication state information shown in FIG. 6 and the number of unit retransmission requests shown in FIG. 7 may be appropriately combined and the communication state may be determined. Due to the use of the communication state information or/and the number of unit retransmission requests, it is possible to easily and highly accurately determine the communication state.

Figure 8:
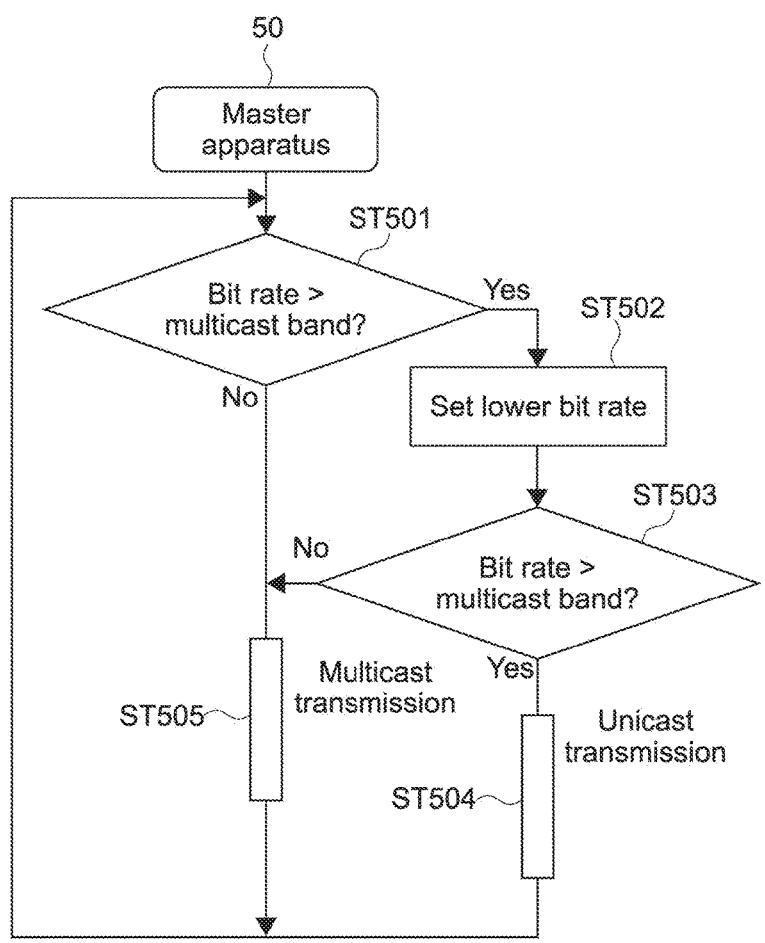
FIG. 8 A flowchart showing a modified example of the selection of the delivery system.

An operation example of changing the bit rate by the encoder 43 will be described. FIG. 8 is a flowchart showing a modified example of the processing of selecting either of the unicast transmission and the multicast transmission (sequence diagram is omitted). As in Step 201 of FIG. 5, whether or not the bit rate of the content is larger than the available band of the multicast transmission is determined (Step 501).

If it is determined that the bit rate is larger (Yes in Step 501), setting of a lower bit rate is executed by the encoder 43. That is, the bit rate is lowered and the content is encoded (Step 502). After that, whether or not the lowered bit rate is larger than the available band of the multicast transmission is determined (Step 503).

If it is determined that the newly set bit rate is larger (Yes in Step 503), the unicast transmission is executed (Step 504). Otherwise, if it is determined that the new bit rate is equal to or smaller than the available band (No in Step 503), the unicast transmission is executed (Step 505).

In this manner, in the example shown in FIG. 8, in the case where the bit rate is variable to be equal to or smaller than the available band of the multicast transmission, the multicast transmission is appropriately selected. With this, the available band of the transmission link can be greatly saved and content can be efficiently and stably delivered.

Figure 9:
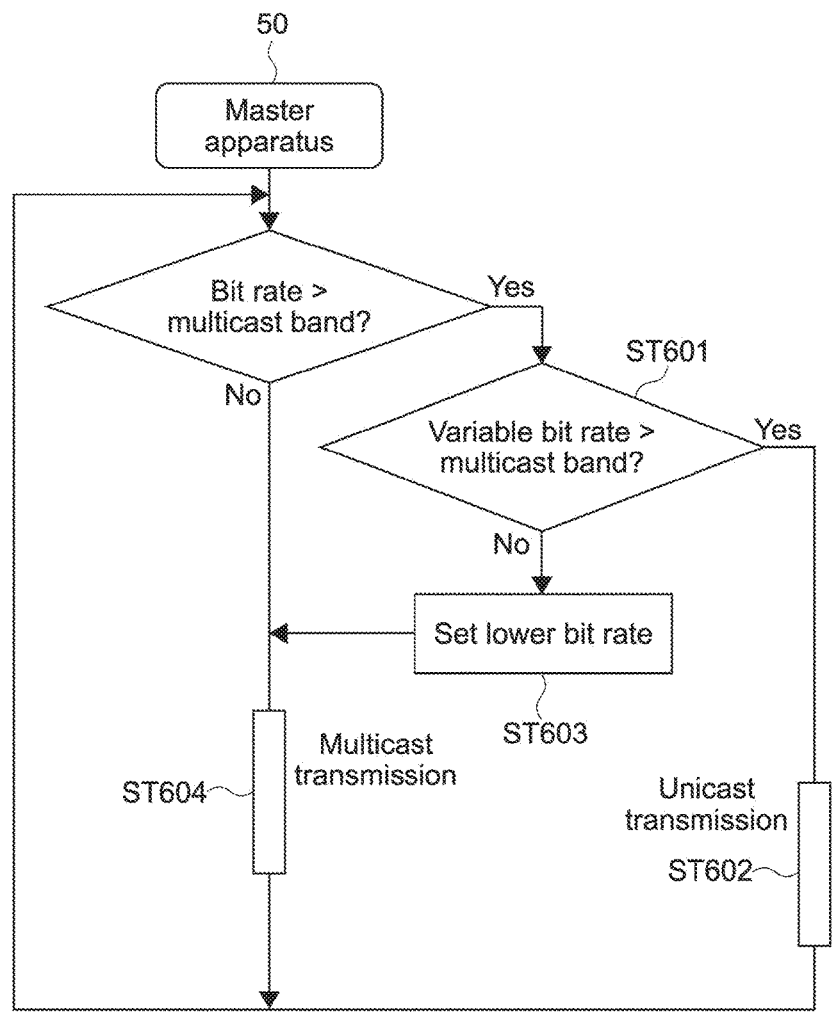
FIG. 9 A flowchart showing a modified example of the selection of the delivery system.

Note that, if the bit rate of the content is larger than the available band, that available band is compared with a bit rate that can be changed by the encoder 43 as shown in Step 601 of FIG. 9. That is, an upper limit of the available band and a lower limit of the variable bit rate may be compared with each other.

If the variable bit rate is larger than the available band (Yes in Step 601), the unicast transmission is selected (Step 602). If the variable bit rate is equal to or smaller than the available band (No in Step 601), the setting of the lower bit rate is executed (Step 603) and the multicast transmission is executed (Step 604). In this case, the bit rate is appropriately set within a range smaller than the upper limit of the available band. For example, the bit rate is set to be a value approximately equal to the upper limit of the available band. With this processing, efficient content delivery can be executed.

Further, it is assumed that the variable bit rate is variable to be equal to or smaller than the available band of the multicast transmission and the bit rate has been changed by the encoder 43. If the bit rate after the change is smaller than a predetermined threshold, not only the multicast transmission but also the unicast transmission may be selected. With this, the quality of the content is maintained to be equal to or larger than a certain level. Such processing is based on considering the quality of the content as important rather than saving of the available band of the transmission link.

Note that, in the case where the delivery system is selected in a manner that depends on the bit rate, the communication state information or/and the number of unit retransmission requests may be used as a parameter of the determination. For example, when the communication state is favorable, the unicast transmission is executed at a relatively high bit rate even if the multicast transmission becomes possible by lowering the bit rate. When the communication state is not so favorable, the multicast transmission is executed at a lowered bit rate even if the quality of the content is slightly deteriorated. With this processing, efficient content delivery becomes possible.

Figure 10:
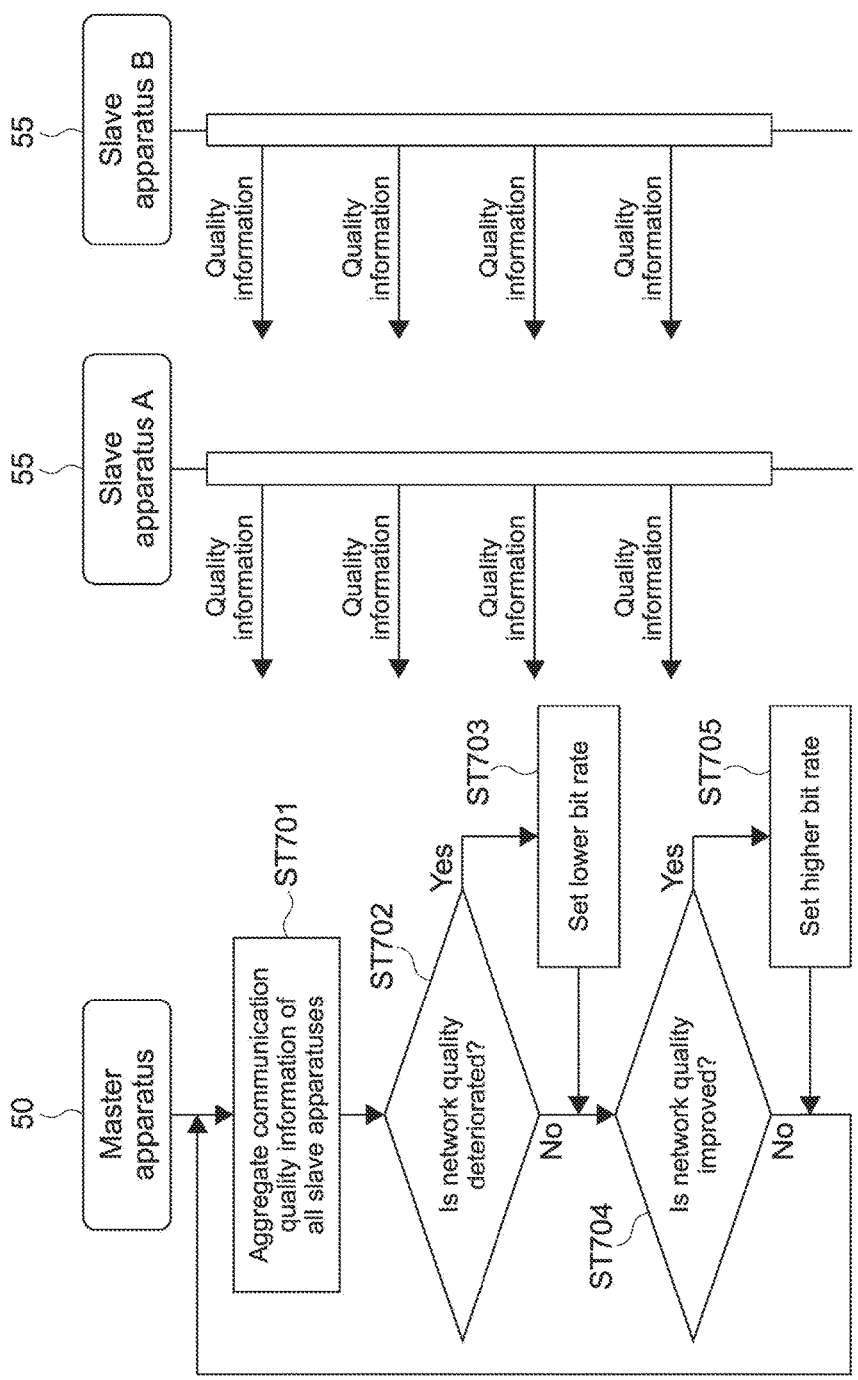
FIG. 10 Flowchart and sequence diagram showing an example of changing a bit rate depending on network quality.
Figure 11:
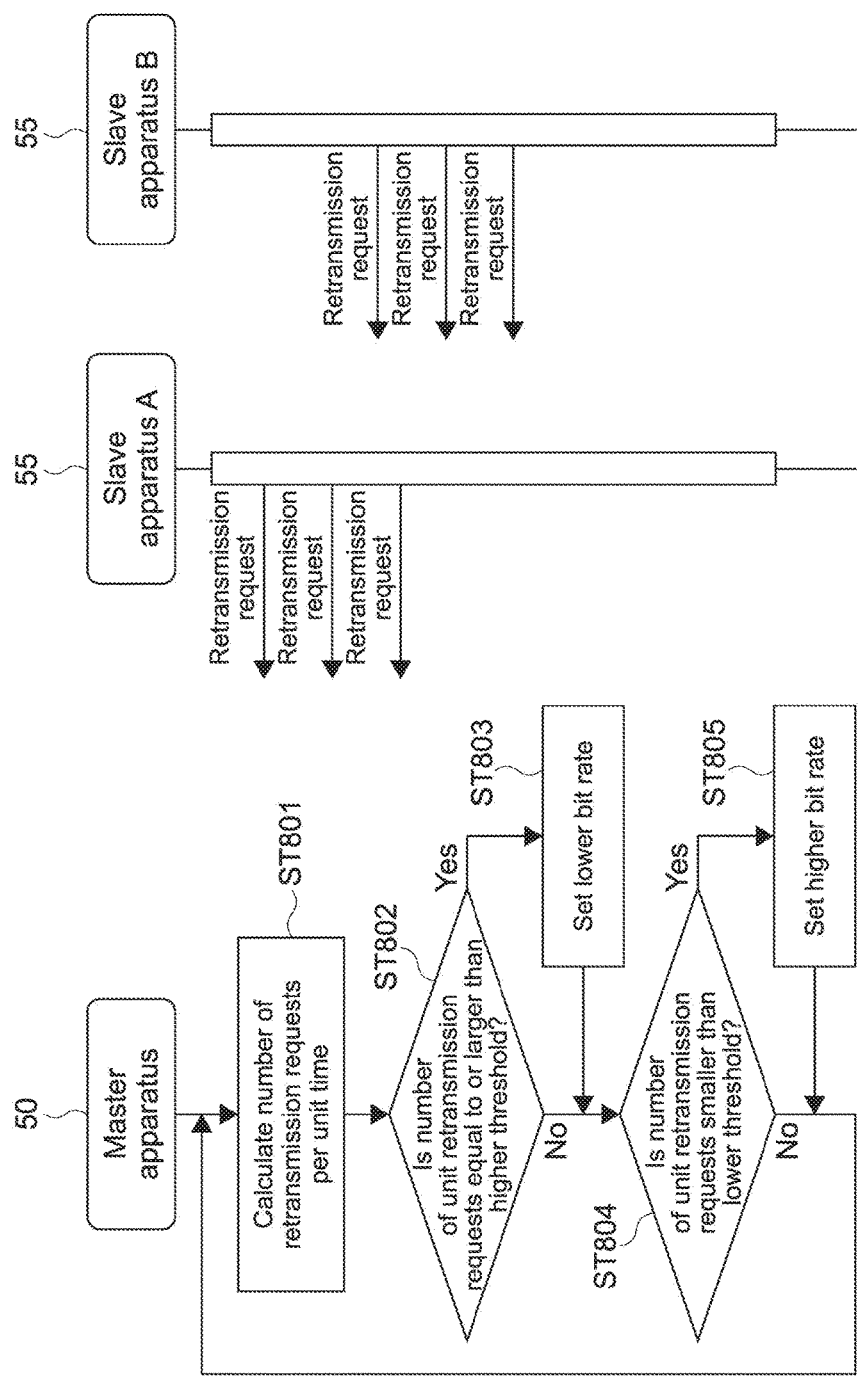
FIG. 11 Flowchart and sequence diagram showing another example of changing the bit rate depending on the network quality.

FIGS. 10 and 11 are flowcharts and sequence diagrams showing an example of changing the bit rate depending on the quality of the entire network within the group (hereinafter, referred to as network quality).

First of all, the communication quality information transmitted from each of the plurality of slave apparatuses 55 is regularly acquired and all communication quality information items are aggregated (Step 701). On the basis of the result of aggregation, whether or not the network quality has been deteriorated is determined (Step 702). If it is determined that the network quality has been deteriorated (Yes in Step 702), the setting of the lower bit rate is executed, prioritizing the connectability (Step 703).

If it is determined that the network quality has not been deteriorated (No in Step 702), whether or not the network quality has been improved is determined (Step 704). If it is determined that the network quality has been improved (Yes in Step 704), setting of a higher bit rate in which the bit rate is set to be a higher value is executed, prioritizing the reproduction quality (Step 705). If it is determined that the network quality has not been improved (No in Step 704), the processing returns to Step 701.

As shown in FIG. 11, the network quality may be determined on the basis of the number of retransmission requests per unit time that are transmitted from each of the plurality of slave apparatuses 55. First of all, the number of retransmission requests per unit time that are transmitted from each slave apparatus 55 is calculated (Step 801). Whether or not the number of unit retransmission requests is equal to or larger than a higher threshold that is a higher threshold of the two thresholds is determined (Step 802). If the number of unit retransmission requests is equal to or larger than the higher threshold (Yes in Step 802), it is determined that the network quality has been deteriorated and the setting of the lower bit rate is executed (Step 803).

If the number of unit retransmission requests is smaller than the higher threshold (No in Step 802), whether or not the number of unit retransmission requests is smaller than a lower threshold that is a lower threshold of the two thresholds is determined (Step 804). If it is determined that the number of unit retransmission requests is equal to or larger than the lower threshold (Yes in Step 804), it is determined that the network quality has been improved and the setting of the higher bit rate is executed (Step 805). If it is determined that the number of unit retransmission requests is smaller than the lower threshold (No in Step 804), the processing returns to Step 801.

Note that the higher threshold and the lower threshold are not limited and may be appropriately set. Further, the network quality may be determined on the basis of the total number of retransmission requests from all the slave apparatuses 55 that are transmitted per unit time.

In this manner, while the unicast transmission and the multicast transmission are being performed, the network quality may be regularly determined and the bit rate of the content may be changed on the basis of the result of determination. With this, stable streaming delivery becomes possible. Every time the bit rate is changed or at predetermined regular time intervals, the selection processing of the delivery system as shown in FIGS. 5, 8, and 9 is executed. With this, an optimal delivery system for the network quality can be selected and efficient content delivery becomes possible.

Note that the setting of the lower bit rate and the setting of the higher bit rate are executed on the basis of an optimized parameter while also referring to the value of the bit rate at that time, for example. Further, the bit rate may be smoothly changed by providing each threshold with a hysteresis characteristic.

<Other Embodiments>

The present technology is not limited to the above-mentioned embodiment and various other embodiments can be realized.

The present technology is also adaptable for an apparatus capable of performing only the unicast transmission. That is, stable streaming delivery that suppresses lowering of communication quality can be realized due to the provision of the function related to the unicast transmission as shown in FIGS. 6 and 7 and the like.

Further, the present technology is also applicable to an apparatus capable of performing delivery only at a fixed bit rate, in which the bit rate of the content cannot be changed. Also in the case where the delivery is executed at the fixed bit rate, stable streaming delivery becomes possible by executing processing or the like of temporarily excluding the communication failure apparatus whose communication state is normal, for example, in the unicast transmission. Further, efficient content delivery becomes possible by appropriately selecting the delivery system on the basis of the device information of the access point, which relates to the multicast transmission.

Whether to make the bit rate of the content fixed or variable may be set by the user. In this case, the above-mentioned processing of the present technology may be appropriately applied in a manner that depends on the user's setting.

Hereinabove, the description has been made exemplifying the slave apparatus 50 within the group as the information processing apparatus according to the present technology. However, it is not limited thereto. The portable terminal 30 that functions as the DMC may be configured as the information processing apparatus according to the present technology. The information processing method according to the present technology is executable by providing the portable terminal 30 with the functions of the delivery control unit 40 (excluding the function of the delivery unit) and the communication state determination unit 41 shown in FIG. 2, for example. As a matter of course, the portable terminal 30 may be provided with the functions of the AP information acquisition unit 42 and the encoder 43.

The temporary exclusion of the communication failure apparatus, the currently executed delivery system, the current bit rate, and the like may be displayed on a display or the like of the portable terminal 30. With this, the user can easily grasp a content delivery condition.

Hereinabove, the description has been made by exemplifying the operations within the group in which the multi-room reproduction is executed. However, the present technology is applicable not only to the reproduction apparatuses that constitute the predetermined group but also to a plurality of arbitrary reproduction apparatuses connected to the wireless network. For example, the present technology is also applicable to a case where content is delivered by the server apparatus 20 shown in FIG. 1 to the plurality of reproduction apparatuses 10 connected to the home network 1.

Regarding changing the bit rate, the unicast transmission is first selected and the setting of the lower bit rate is executed until the network quality becomes stable (determined on the basis of a predetermined threshold or the like). In the case where the network quality is still unstable even after the setting of the lower bit rate is executed, whether or not the multicast transmission can be selected is determined. Such an operation may be executed.

At least two feature parts of the above-mentioned feature parts according to the present technology can also be combined. That is, the various feature parts described in each of the embodiments may be arbitrarily combined without distinction of the embodiments. Further, various effects described above are merely examples and not limitative and other effects may be provided.

Note that the present technology may also take the following configurations.

(1) An information processing apparatus, including:

a determination unit that determines, regarding each of a plurality of reproduction apparatuses, which becomes a target of streaming delivery of content by unicast via a wireless network, whether or not a communication state of the wireless network is normal; and a delivery control unit that excludes a communication failure apparatus that is a reproduction apparatus of the plurality of reproduction apparatuses, whose communication state is determined not to be normal, from the target of the streaming delivery by the unicast.

(2) The information processing apparatus according to (1), in which the plurality of reproduction apparatuses constitute a group capable of concurrently reproducing identical content, and the delivery control unit excludes the communication failure apparatus from the target of the streaming delivery of the identical content by the unicast.

(3) The information processing apparatus according to (1) or (2), in which the determination unit regularly executes determination of the communication state, and if it is, in the regular determination of the determination unit, determined that the communication state of the communication failure apparatus has normally recovered, the delivery control unit sets the reproduction apparatus, which had been the communication failure apparatus, as the target of the streaming delivery by the unicast.

(4) The information processing apparatus according to any one of (1) to (3), in which the determination unit determines the communication state on the basis of at least one of the number of retransmission requests per unit time that are transmitted from each of the plurality of reproduction apparatuses and communication quality information transmitted from each of the plurality of reproduction apparatuses.

(5) The information processing apparatus according to (4), in which
the communication quality information includes information on at least one of reception electric field strength and data transfer speed.

(6) The information processing apparatus according to any one of (1) to (5), in which
each of the plurality of reproduction apparatuses is connected to an access point via the wireless network, and
the information processing apparatus further including
an acquisition unit that acquires device information of the access point, which relates to streaming delivery of the content by multicast, in which
the delivery control unit selects, on the basis of the acquired device information, either of the streaming delivery by the unicast and the streaming delivery by the multicast for execution.

(7) The information processing apparatus according to (6), in which
the device information includes information on a band available for the streaming delivery by the multicast, and
the delivery control unit selects the streaming delivery by the multicast if a bit rate of the content is equal to or smaller than the band available for the streaming delivery by the multicast.

(8) The information processing apparatus according to (6) or (7), further including
a setting unit capable of variably setting a bit rate of the content, in which
the delivery control unit selects the streaming delivery by the multicast if the bit rate set by the setting unit is equal to or smaller than the available band.

(9) The information processing apparatus according to any one of (1) to (8), further including:
a connection unit connectable to the plurality of reproduction apparatuses via the wireless network; and
a delivery unit capable of delivering the content to each of the plurality of reproduction apparatuses via the wireless network by the unicast.

REFERENCE SIGNS LIST

1 home network
10 plurality of reproduction apparatuses
20 server apparatus
30 portable terminal
40 delivery control unit
41 communication state determination unit
42 AP (access point) information acquisition unit
43 encoder
50 master apparatus
55 slave apparatus
100 network system

The invention claimed is:

1. An information processing apparatus, comprising:
at least one processor configured to:
determine, for each of a plurality of reproduction apparatuses which becomes a target of streaming delivery of content by unicast via a wireless network, whether a communication state of the wireless network corresponds to a threshold communication quality;
exclude a communication failure apparatus from the target of the streaming delivery by the unicast, wherein the communication failure apparatus is a reproduction apparatus of the plurality of reproduction apparatuses for which the communication state is determined not to correspond to the threshold communication quality,
wherein each of the plurality of reproduction apparatuses is connected to an access point via the wireless network;
acquire device information of the access point, which relates to streaming delivery of the content by multicast, wherein the device information includes information on a band available for the streaming delivery by the multicast;
select one of the streaming delivery by the unicast or the streaming delivery by the multicast for execution based on the device information; and
select the streaming delivery by the multicast based on a bit rate of the content that is equal to or smaller than the band available for the streaming delivery by the multicast.

2. The information processing apparatus according to claim 1, wherein
the plurality of reproduction apparatuses constitute a group configured to concurrently reproduce identical content, and
the at least one processor is configured to exclude the communication failure apparatus from the target of the streaming delivery of the identical content by the unicast.

3. The information processing apparatus according to claim 1, wherein the at least one processor is configured to:
regularly execute a determination of the communication state; and
based on a determination that the communication state of the communication failure apparatus has recovered, set the reproduction apparatus, which had been the communication failure apparatus, as the target of the streaming delivery by the unicast.

4. The information processing apparatus according to claim 1, wherein the at least one processor is configured to determine the communication state based on at least one of a number of retransmission requests per unit time that are transmitted from each of the plurality of reproduction apparatuses or communication quality information transmitted from each of the plurality of reproduction apparatuses.

5. The information processing apparatus according to claim 4, wherein the communication quality information includes information on at least one of reception electric field strength or data transfer speed.

6. An information processing apparatus, comprising:
at least one processor configured to:
determine, for each of a plurality of reproduction apparatuses which becomes a target of streaming delivery of content by unicast via a wireless network, whether a communication state of the wireless network corresponds to a threshold communication quality;
exclude a communication failure apparatus from the target of the streaming delivery by the unicast, wherein the communication failure apparatus is a reproduction apparatus of the plurality of reproduction apparatuses for which the communication state is determined not to correspond to the threshold communication quality,
wherein each of the plurality of reproduction apparatuses is connected to an access point via the wireless network,
acquire device information of the access point, which relates to streaming delivery of the content by multicast;
select one of the streaming delivery by the unicast or the streaming delivery by the multicast for execution based on the acquired device information;
variably set a bit rate of the content; and
select the streaming delivery by the multicast based on the set bit rate that is equal to or smaller than a band available for the streaming delivery by the multicast.

7. The information processing apparatus according to claim 6, wherein
the plurality of reproduction apparatuses constitute a group configured to concurrently reproduce identical content, and
the at least one processor is configured to exclude the communication failure apparatus from the target of the streaming delivery of the identical content by the unicast.

8. The information processing apparatus according to claim 6, wherein the at least one processor is configured to:
regularly execute a determination of the communication state; and
based on a determination that the communication state of the communication failure apparatus has recovered, set the reproduction apparatus, which had been the communication failure apparatus, as the target of the streaming delivery by the unicast.

9. The information processing apparatus according to claim 6, wherein the at least one processor is configured to determine the communication state based on at least one of a number of retransmission requests per unit time that are transmitted from each of the plurality of reproduction apparatuses or communication quality information transmitted from each of the plurality of reproduction apparatuses.

10. The information processing apparatus according to claim 9, wherein the communication quality information includes information on at least one of reception electric field strength or data transfer speed.

11. An information processing method, comprising:
by a computer:
determining, for each of a plurality of reproduction apparatuses which becomes a target of streaming delivery of content by unicast via a wireless network, whether a communication state of the wireless network corresponds to a threshold communication quality;
excluding a communication failure apparatus from the target of the streaming delivery by the unicast, wherein the communication failure apparatus is a reproduction apparatus of the plurality of reproduction apparatuses for which the communication state is determined not to correspond to the threshold communication quality,
wherein each of the plurality of reproduction apparatuses is connected to an access point via the wireless network;
acquiring device information of the access point, which relates to streaming delivery of the content by multicast, wherein the device information includes information on a band available for the streaming delivery by the multicast;
selecting one of the streaming delivery by the unicast or the streaming delivery by the multicast for execution based on the device information; and
selecting the streaming delivery by the multicast based on a bit rate of the content that is equal to or smaller than the band available for the streaming delivery by the multicast.

12. The information processing method according to claim 11, wherein
the plurality of reproduction apparatuses constitute a group configured to concurrently reproduce identical content, and
the communication failure apparatus is excluded from the target of the streaming delivery of the identical content by the unicast.

13. The information processing method according to claim 11, further comprising:
regularly executing a determination of the communication state; and
based on a determination that the communication state of the communication failure apparatus has recovered, setting the reproduction apparatus, which had been the communication failure apparatus, as the target of the streaming delivery by the unicast.

14. The information processing method according to claim 11, further comprising determining the communication state based on at least one of a number of retransmission requests per unit time that are transmitted from each of the plurality of reproduction apparatuses or communication quality information transmitted from each of the plurality of reproduction apparatuses.

15. The information processing method according to claim 14, wherein the communication quality information includes information on at least one of reception electric field strength or data transfer speed.

16. An information processing method, comprising:
by a computer:
determining, for each of a plurality of reproduction apparatuses which becomes a target of streaming delivery of content by unicast via a wireless network, whether a communication state of the wireless network corresponds to a threshold communication quality;
excluding a communication failure apparatus from the target of the streaming delivery by the unicast, wherein the communication failure apparatus is a reproduction apparatus of the plurality of reproduction apparatuses for which the communication state is determined not to correspond to the threshold communication quality,
wherein each of the plurality of reproduction apparatuses is connected to an access point via the wireless network;
acquiring device information of the access point, which relates to streaming delivery of the content by multicast;
selecting one of the streaming delivery by the unicast or the streaming delivery by the multicast for execution based on the acquired device information;
variably setting a bit rate of the content; and
selecting the streaming delivery by the multicast based on the set bit rate that is equal to or smaller than a band available for the streaming delivery by the multicast.

17. The information processing method according to claim 16, wherein
- the plurality of reproduction apparatuses constitute a group configured to concurrently reproduce identical content, and
- the communication failure apparatus is excluded from the target of the streaming delivery of the identical content by the unicast.

18. The information processing method according to claim 16, further comprising:
- regularly executing a determination of the communication state; and
- based on a determination that the communication state of the communication failure apparatus has recovered, setting the reproduction apparatus, which had been the communication failure apparatus, as the target of the streaming delivery by the unicast.

19. The information processing method according to claim 16, further comprising determining the communication state based on at least one of a number of retransmission requests per unit time that are transmitted from each of the plurality of reproduction apparatuses or communication quality information transmitted from each of the plurality of reproduction apparatuses.

20. The information processing method according to claim 19, wherein the communication quality information includes information on at least one of reception electric field strength or data transfer speed.

21. A non-transitory computer-readable medium having stored thereon, computer-executable instructions, which when executed by a computer, cause the computer to execute operations, the operations comprising:
- determining, for each of a plurality of reproduction apparatuses which becomes a target of streaming delivery of content by unicast via a wireless network, whether a communication state of the wireless network corresponds to a threshold communication quality; and
- excluding a communication failure apparatus from the target of the streaming delivery by the unicast, wherein the communication failure apparatus is a reproduction apparatus of the plurality of reproduction apparatuses for which the communication state is determined not to correspond to the threshold communication quality,
- wherein each of the plurality of reproduction apparatuses is connected to an access point via the wireless network;
- acquiring device information of the access point, which relates to streaming delivery of the content by multicast, wherein the device information includes information on a band available for the streaming delivery by the multicast;
- selecting one of the streaming delivery by the unicast or the streaming delivery by the multicast for execution based on the device information; and
- selecting the streaming delivery by the multicast based on a bit rate of the content that is equal to or smaller than the band available for the streaming delivery by the multicast.

* * * * *